Dec. 26, 1950  L. A. WEAVER  2,535,182
UNIFORM DEPTH OF CUT WOODGROOVING MACHINES
Filed July 29, 1948  2 Sheets-Sheet 2

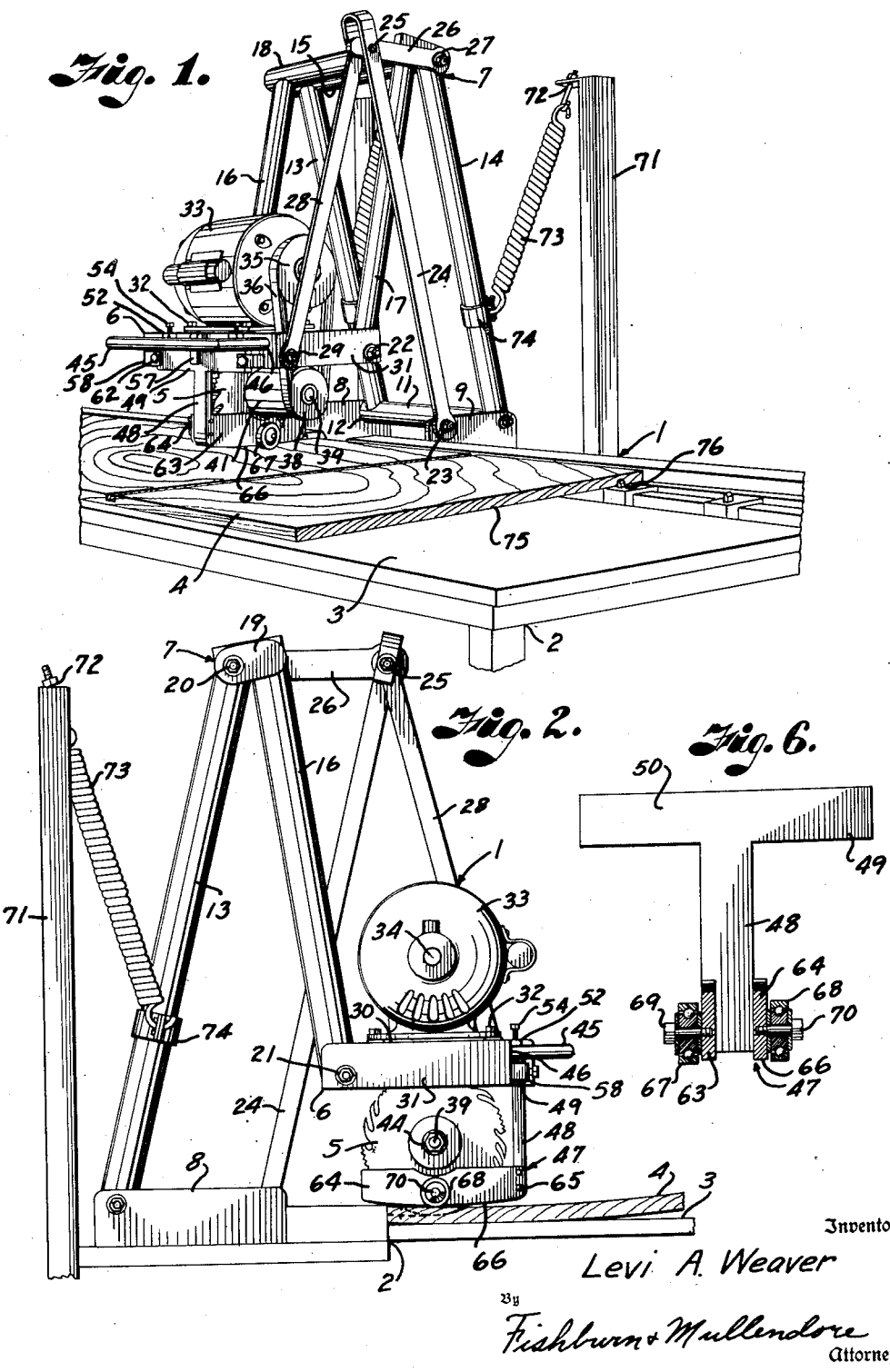

Inventor
Levi A. Weaver
By
Fishburn & Mullendore
Attorneys

Patented Dec. 26, 1950

2,535,182

UNITED STATES PATENT OFFICE 2,535,182

UNIFORM DEPTH OF CUT WOODGROOVING MACHINES

Levi A. Weaver, Kansas City, Kans.

Application July 29, 1948, Serial No. 41,190

5 Claims. (Cl. 144—136)

This invention relates to woodworking machines, and more particularly to such machines adapted for uniformly cutting and/or grooving boards and the like of different thickness and widths and having curved or irregular surfaces. Machines have been used for grooving lumber for use in making cabinets and the like by passing the boards through rollers adjacent various types of saws or "dado" blades. Also devices have been utilized to apply pressure to boards in an effort to straighten them during grooving operations. Such devices either are expensive or difficult to operate and other methods of grooving are satisfactory only if the lumber is substantially flat. When a board is curved due to warping, the groove varies in depth with the result that the board, when pulled against members received in the groove, does not present a flat surface.

The objects of the present invention are to provide a device for grooving boards whereby the depth of the groove is uniform across a curved board; to provide a parallel motion mounting of a motor driven cutter for maintaining parallel relationship between the motor carriage and work supporting surface during vertical and transverse movement of the cutter over a board being grooved or worked; to provide an adjustable guide and roller for gauging the depth of a cut and maintaining said depth uniform regardless of irregularities in the board being worked; and to provide a cutting and/or grooving machine of sturdy construction, safe, easy and accurate in operation and economical to manufacture.

In accomplishing these and other objects of the present invention, I have provided improved details of structure, the preferred form of which is illustrated in the accompanying drawings, wherein:

Fig. 1 is a perspective view of a woodworking machine embodying the features of the present invention.

Fig. 2 is a side elevation of the motor driven cutter and support therefor, particularly illustrating the position of the cutter and gauge relative to a board being worked.

Fig. 6 is a sectional view through the mounting of the rollers on the cutter gauge.

Figure 3:
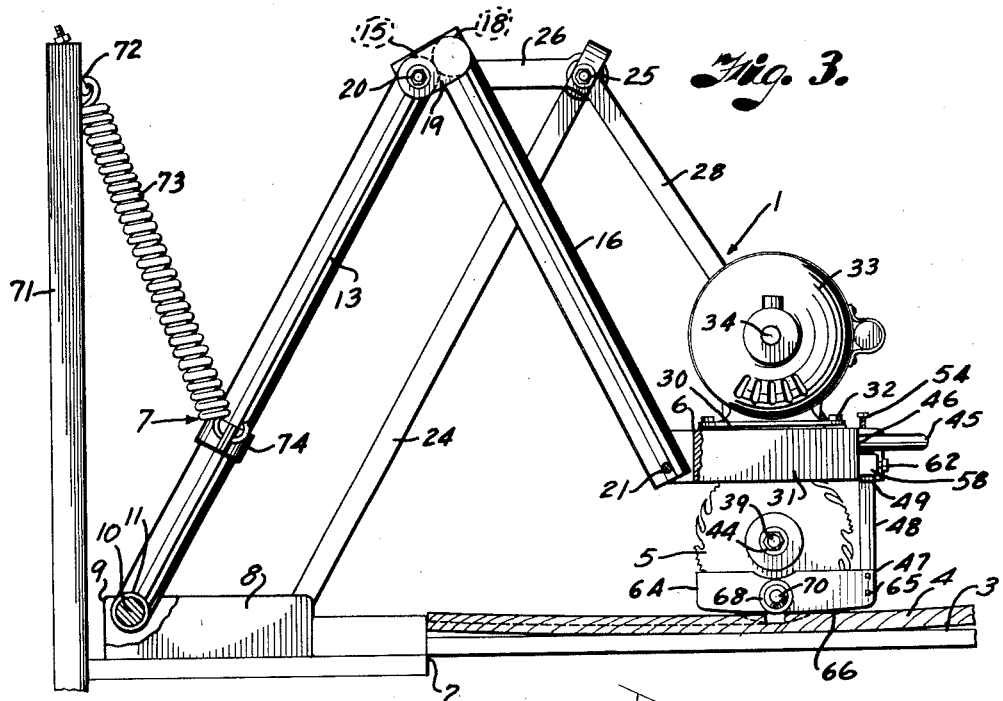
Fig. 3 is a view of the woodworking machine similar to Fig. 2, illustrating the position of the respective parts of the machine as the cutter is moved across a board being worked.
Figures 4, 5:
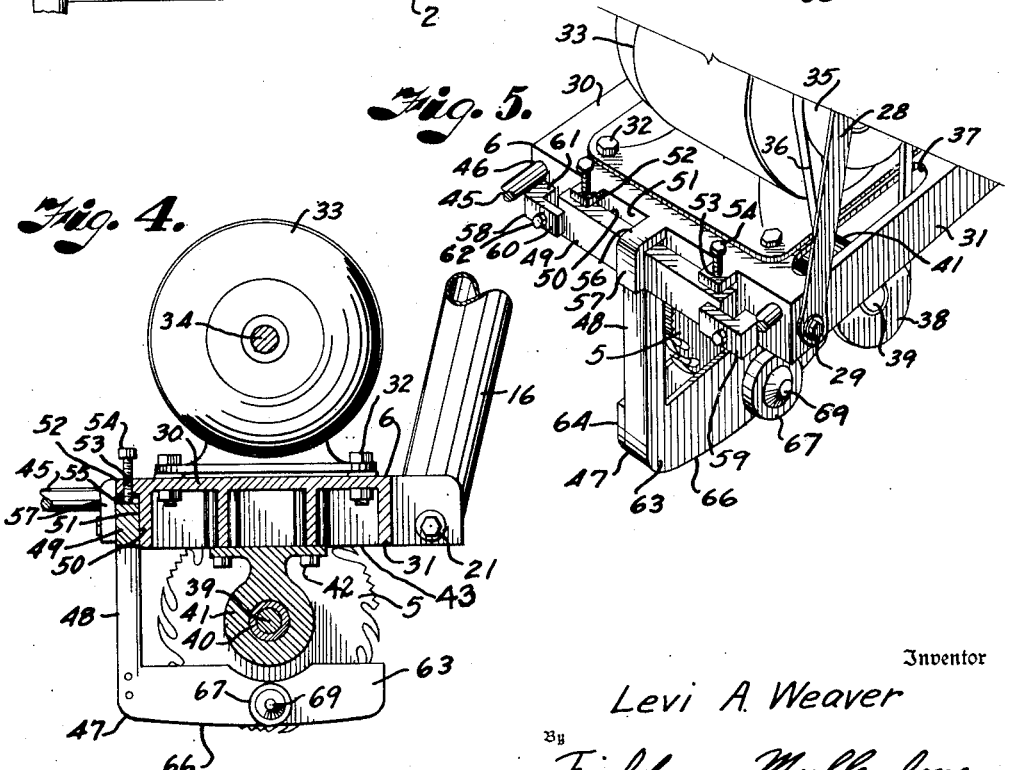
Fig. 4 is a transverse sectional view through the motor mounting carriage and cutter supporting bearings.
Fig. 5 is a fragmentary perspective view, particularly illustrating the mounting of the cutter gauge on the motor carriage.

Referring more in detail to the drawings:

1 designates a woodworking machine generally including a table 2, having a work surface 3 for supporting boards or the like 4 for cutting and/or grooving operations by a motor driven cutter 5 mounted on a carriage 6 which is mounted on a supporting structure 7 for vertical and transverse movement relative to the board 4.

The supporting structure 7 is a parallel motion arrangement for maintaining the carriage 6 substantially parallel with the surface 3 of the work table at all times and consists of spaced vertical flanges 8 and 9 extending upwardly from the rear of the table 2 and parallel with the direction of movement of the cutter transversely of said work table.

A shaft 10 is rigidly secured to the rear portions of the flanges 8 and 9 and rotatably mounted on said shaft is a tubular member 11, the ends 12 of which substantially engage the inner surfaces of the flanges in such a manner as to prevent any looseness or longitudinal movement of the tubular member 11. Suitably secured as by welding to the tubular member 11, adjacent the ends thereof, are upwardly extending parallel arms 13 and 14, said arms being of equal length and secured at their upper ends to a head member 15. Spaced forwardly and substantially in alignment with the arms 13 and 14 are arms 16 and 17 connected at their upper ends by a transverse member 18 which carries rearwardly extending ears 19 pivotally connected as at 20 to the head member 15. With this arrangement the upper ends of the arms 16 and 17 are spaced from the pivotal connection 20 sufficiently whereby said arms 16 and 17 can be moved to lie alongside of the arms 13 and 14 in substantial engagement throughout the length thereof. The arms 16 and 17 are shorter in length than the arms 13 and 14 and the lower ends are pivotally mounted as at 21 and 22 adjacent the rear of the carriage 6 to support the rear of said carriage above the work table sufficiently for mounting the cutter 5 below said carriage, as later described.

Pivotally mounted on the forward portion of the flange 9 as at 23 is an arm 24, the upper end of which is pivotally mounted as at 25 adjacent the forward end of an arm 26, having its rear end pivoted as at 27, coaxially with the pivotal mounting of the arms 13 and 14 on the head 15 which is designated 20. The distance between the centers of the pivotal connections 23 and 25, or the effective length of the arm 24, is the same as the distance between the pivotal connections of the arms 13 and 14 with the flanges 8 and 9 and the pivotal connection 20. The distance between the pivotal connection 23 and the axis of the tubular member 11 is identical with the distance between the pivotal connections 25 and 27. Therefore, the arm 24 will always be parallel in any position with the arms 13 and 14 and the arm 26 will be parallel with a plane passing through the pivotal connection 23 and the axis of the tubular member 11.

Connected to the arm 26, as by the pivotal connection 25, is an arm 28, the lower end of which is pivotally connected as at 29 adjacent the forward portion of the carriage 6 in such a manner that the spacing between the pivotal connections 22 and 29 is the same as the spacing between the pivotal connections 25 and 27. The effective length of the arm 28 is the same as the effective length of the arms 16 and 17, thereby maintaining the carriage 6 parallel with the work table surface 3 at all times, regardless of the vertical or transverse movement of the cutter relative to the said surface.

The carriage 6 is preferably a casting having a top wall 30 and suitable depending flanges 31 to provide a reinforced rigid structure adapted to carry the cutter and drive therefor. Suitably mounted on the top wall 30 and secured thereto, as by bolts 32, is a motor 33 having a shaft 34 on which is secured a sheave wheel 35. Operatively engaged with the sheave wheel is a belt 36 which extends through a slot 37 in the top wall 30 of the carriage 6. The belt is operatively engaged with a sheave wheel 38 keyed to a shaft 39 rotatably mounted in a bushing 40 carried by a bearing member 41 which is secured, as by bolts 42, to the lower face 43 of the carriage 6, whereby energization of the motor 33 will rotate the sheave wheel 35 to drive the sheave wheel 38 and shaft 39 by means of the belt 36. The sheave wheel 38 is arranged at one end of the bearing member 41 and the shaft 39 extends through said bearing member whereby the opposite end of said shaft is adapted for mounting of suitable cutter members 5, secured on said shaft by means of a nut 44 whereby the cutter may be removed and replaced as desired. In order to manipulate the apparatus whereby the cutter may be moved across a board 4 for cutting and/or grooving the same, a handle member 45 is secured to the forward portion of the carriage 6, said handle preferably being a U-shaped member, the legs of which are suitably secured to the depending flange 31 on the forward side of the carriage as at 46.

A combination cutter guard and depth gauge 47 is adjustably mounted on the carriage 6. Said combination gauge and guard preferably consists of a vertical member 48 terminating at its upper end in laterally directed arms 49 having a machined inner face 50 adapted to engage the machined forward face 51 of the carriage 6, the ends of the arms 49 being of such length as to extend under ears 52 projecting forwardly from the carriage and having threaded apertures 53 therein for mounting setscrews 54, the lower ends 55 of which are adapted to engage the upper face of the arms 49 and threading of the screws in the ears 52 will adjust the relative position of the gauge member relative to the cutter 5.

Preferably formed on the carriage 6, in alignment with the vertical member 48, is an outwardly directed flange 56 terminating in a downwardly directed finger 57 adapted to engage the outer surface of the vertical member 48 to cooperate with the machined surface 51 of the carriage to form a recess to receive and guide said vertical member 48 relative to the carriage. Clamps 58 and 59 are mounted on the carriage 6 adjacent the ends of the arms 49 and consist of fingers 60 adapted to overlie the forward surface of said arms, the outer ends of said fingers terminating in lugs 61 engaging the machined surface 51 of the carriage whereby screws 62 between the ends of the arms and the lug 61 may be threaded into the carriage 6 to draw the fingers 60 against the arms 49 and clamp the same in engagement with the machined surface 51.

The lower end of the vertical member 48 is provided with spaced rearwardly extending gauge members 63 and 64. In the particular structure illustrated the gauge member 63 is integral with the vertical member 48 and adjacent one side edge thereof, and the gauge member 64 is removably secured to the opposite side of said vertical member by means of screws or the like 65, whereby the gauge members are parallel and extend rearwardly of the vertical member 48 and on each side of the cutter 5. The removable mounting of the gauge member 64 provides access to the cutter for removal to sharpen or replace the same without disturbing the setting of the gauge. The lower edges 66 of said gauge members are formed on an arc having suitable radius whereby the portion directly under the axis of rotation of the cutter is the lowermost point of said gauge members, and the opposite ends of the respective gauge members are spaced from the board upon which work is to be done.

The curvature of the gauge members is such that as the cutter is drawn toward a board to be grooved, the gauge members will ride on the upper surface of the board and permit the cutter 5 to penetrate a depth of the board only to the extent of the portion of the cutter extending below the arcuate edge 66 of said gauge members. In the same manner the cutter is supported as it leaves the board whereby the groove at the ends will be of the same depth as at any intermediate portion of the board. Also for work requiring preformed curvature in the board to be grooved, the radius of the arcuate edge 66 may be arranged to suitably support the cutter at all times to maintain the grooves of uniform depth.

To facilitate the movement of the cutter across the board, rollers 67 and 68 are suitably mounted on the outer sides of the gauge members 63 and 64 as by bolts 69 and 70. Preferably the rollers 67 and 68 are ball bearings or the like to reduce friction and the rollers are so mounted that the lower extremity of the periphery is directly below the axis of rotation of the cutter and is slightly below the edge 66 of the gauge member 63 and 64, whereby the rollers will engage the surface of the board to be grooved and support the cutter thereon, except in portions of the board as shown in Fig. 3 wherein there are openings, recesses, or other grooves, and in such instances the lower edge 66 of the gauges engage the upper surface of the board to support the same until such time as the rollers move across the depression or recess.

In order to facilitate operation of the device, vertically arranged anchorage members 71 are secured to the rear of the table and extend upwardly adjacent the flanges 8 and 9. Suitably secured to the upper ends of the members 71, as at 72, are springs 73, the opposite ends of which are secured to collars 74 mounted on the arms 13 and 14 in such a manner that movement of the cutter transversely of a board and resulting pivotal movement of the arms 13 and 14 extends the springs 73, thereby providing a force tending to draw said arms upwardly and rearwardly to facilitate the return movement of the cutter to a position at the rear of the table 2.

In operating a device constructed as described, a board or the like is placed on the work surface 3 of the table 2 and the end 75 of said board is brought into contact with suitable stops 76 adjusted on the table whereby the end of the board will be spaced from a transverse line in alignment with the cutter 5 to properly position the groove on the board. The screws 62 are loosened slightly and the set screws 54 rotated to adjust the arcuate edge 66 of the gauge members and the lower periphery of the rollers 67 and 68 relative to the periphery of the cutter 5 whereby the cutter will extend below the rollers and gauge members the desired amount for a suitable depth of groove. The screws 62 are then tightened to clamp the arms 49 in engagement with the machined face 51 of the carriage 6 to securely hold the gauge members and rollers thereon in adjusted position. The motor 33 is then energized by closing a switch in a suitable electric circuit to rotate the sheave 35 and drive the sheave 38 through the engagement of the belt 36. This rotates the shaft 39 in the bearing bushings 40 to operate the cutter 5. The handle 45 is then grasped to apply force tending to pull the carriage toward the board to be grooved. Forward movement of the carriage effects hinging movement of the arms 13, 14, 16, 17, 23, and 24 and extension of the springs 73. The weight of the motor, carriage and cutter mounting is such that as the respective arms are hinged forwardly the carriage tends to move downwardly to effect engagement of the cutter with the board to be grooved and the springs 73 tend to balance said weight to reduce the drag required to move the cutter across the board. As the cutter and carriage are drawn forwardly, the forward portion of the arcuate edge 66 on the gauge members engages the edge of the board and rides upwardly thereon to support the carriage and cutter assembly before the cutter actually engages the board. Further movement causes the cutter to start cutting the groove and as the proper depth of the groove is reached at the edge of the board the rollers 67 and 68 engage the upper surface of said board to further support and facilitate the movement of the cutter assembly across said board. The radius of the arcuate edge 66 is less than the radius of a curved board to be worked upon, therefore the gauge will follow the curvature to make a uniform depth of groove across the board. In instances where there are recesses or longitudinal grooves in the board, the roller would tend to drop therein; however, the arcuate edge of the gauge members will support the weight of the motor driven cutter during movement across such irregularities to maintain the groove substantially uniform thereacross.

While the boards shown in Figs. 2 and 3 are curved upwardly, it is believed obvious that a board having a reverse curvature could also be grooved uniformly in the same manner. If boards having a preformed curvature, such as barrel staves or the like, are to be grooved, the apparatus will perform satisfactorily, the only variation that is required being that a suitable diameter cutter be applied to the shaft 39 and that the gauge have a suitable curvature wherein the radius is less than the radius of the curvature of the board.

The cutter 5 may be removed for sharpening or replacing without disturbing the setting of the gauge member by removing screws 65 and gauge member 64. The nut 44 is then removed from the shaft 39 to release the cutter. After the cutter is sharpened and/or replaced on the shaft the gauge member 64 is secured to the member 48 in the same relative position as before removal. Also the gauge member 63 has not been moved so the same setting of said gauge is maintained if desired.

It is believed obvious that I have provided a cutting and/or grooving machine of sturdy construction, positive and accurate in operation, yet simple in construction and easy to manufacture which will groove boards uniformly regardless of the curvature thereof.

What I claim and desire to secure by Letters Patent is:

1. In a woodworking machine, a table for supporting material for woodworking operations, a carriage, means on the table for supporting the carriage for movement transversely and vertically relative to the table, a circular cutter, means mounted under said carriage for rotatably mounting the circular cutter, a motor on the carriage and having driving connection with the cutter for rotating the same, gauge means on the carriage having work-engaging portions extending alongside of the cutter to limit the depth of a cut made by the cutter, and rollers mounted on the gauge means below the axis of the cutter with the lowermost point of said roller slightly below said work-engaging portion.

2. In a woodworking machine, a table having a surface for supporting material for woodworking operations, a carriage, means on the table for supporting the carriage for movement in a plane perpendicular to the table surface, a circular cutter rotatably supported by said carriage, a motor on the carriage and having driving connection with the cutter for rotating the same, a gauge member on the carriage and having portions extending alongside of the cutter, said gauge member having arcuate lower edges of substantially longer radius than the radius of the cutter for engaging the material on the table for limiting the depth of the cut made therein, and rollers mounted on the gauge member below the axis of the cutter and having their lowermost point slightly below the arcuate edge of the gauge member for normally engaging the material, whereby the gauge member supports the carriage as the cutter moves on and off and over low spots in the material.

3. In a woodworking machine, a table having a surface for supporting material for woodworking operations, a carriage, means on the table for supporting the carriage for movement in a plane perpendicular to the table surface, a circular cutter rotatably mounted under said carriage, a motor on the carriage and having driving connection with the cutter for rotating the same, an arm adjustably mounted on the carriage and extending downwardly therefrom in the plane of the cutter, a gauge member on the arm and extending alongside of the cutter, said gauge member having arcuate lower edges of substantially longer radius than the radius of the cutter for engaging the material on the table for limiting the depth of the cut made therein, and rollers mounted on the gauge member below the axis of the cutter and having their lowermost point slightly below the arcuate edge of the gauge member for normally engaging the material, whereby the gauge member supports the carriage as the cutter moves on and off and over low spots in the material.

4. In a woodworking machine, a carriage, a cutter rotatably mounted on said carriage, a motor on the carriage and having driving connection with the cutter for rotating the same, a table for supporting material to be grooved by the cutter, a plurality of arms pivotally mounted on the table for parallel movement, a plurality of arms pivotally mounted on the carriage for parallel movement, means connecting the arms on the carriage with the respective arms on the table for cooperative parallel movement to maintain the carriage parallel with the table and support said carriage for vertical and transverse movement relative to said table, and gauge means adjustably mounted on the carriage and positioned adjacent the cutter for engaging the material being grooved and limiting the depth of the cut made by said cutter.

5. In a woodworking machine, a carriage, a cutter rotatably mounted on said carriage, a motor on the carriage and having driving connection with the cutter for rotating the same, a table for supporting material to be grooved by the cutter, a plurality of arms pivotally mounted on the table for parallel movement, a plurality of arms pivotally mounted on the carriage for parallel movement, means connecting the arms on the carriage with the respective arms on the table for cooperative parallel movement to maintain the carriage parallel with the table and support said carriage for vertical and transverse movement relative to said table, resilient means having connection with the table and the arms thereon for partially balancing the weight of the carriage, and gauge means adjustably mounted on the carriage and positioned adjacent the cutter for limiting the depth of the cut made by said cutter.

LEVI A. WEAVER.

REFERENCES CITED

The following references are of record in the file of this patent:

UNITED STATES PATENTS

| Number | Name | Date |
| --- | --- | --- |
| 460,699 | Autenrieth | Oct. 6, 1891 |
| 1,174,890 | Naylor | Mar. 7, 1916 |
| 1,546,982 | Hilthon et al. | July 21, 1925 |
| 1,576,671 | Meyer | Mar. 16, 1926 |
| 2,193,864 | Fidler et al. | Mar. 19, 1940 |
| 2,320,743 | Nilsen et al. | June 1, 1943 |

FOREIGN PATENTS

| Number | Country | Date |
| --- | --- | --- |
| 219,584 | Great Britain | July 31, 1924 |